United States Patent
Zhou et al.

(10) Patent No.: US 7,147,894 B2
(45) Date of Patent: Dec. 12, 2006

(54) METHOD FOR ASSEMBLING NANO OBJECTS

(75) Inventors: Otto Z. Zhou, Chapel Hill, NC (US); Hideo Shimoda, Chapel Hill, NC (US); Soojin Oh, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 117 days.

(21) Appl. No.: 10/103,803

(22) Filed: Mar. 25, 2002

(65) Prior Publication Data

US 2003/0180472 A1 Sep. 25, 2003

(51) Int. Cl.
B05D 1/18 (2006.01)

(52) U.S. Cl. .................. 427/256; 427/430.1; 427/903; 977/847; 977/848; 977/882

(58) Field of Classification Search .................. 427/77, 427/78, 180, 197, 200, 201, 202, 256, 286, 427/287, 421, 425, 430.1, 443.2, 903; 423/445 R, 423/445 B, 447.1, 447.2, 447.3; 117/54, 117/56, 58, 60, 64, 68, 70

See application file for complete search history.

(56) References Cited

U.S. PATENT DOCUMENTS

| | | | | |
|---|---|---|---|---|
| 4,249,988 | A * | 2/1981 | Lavigna et al. ............... 117/21 |
| 4,728,576 | A * | 3/1988 | Gillberg-LaForce et al. ..... 428/411.1 |
| 5,078,830 | A * | 1/1992 | Shirata et al. ................. 117/17 |
| 5,322,591 | A * | 6/1994 | Harris et al. .................. 117/71 |
| 5,801,092 | A * | 9/1998 | Ayers ......................... 438/623 |
| 5,879,836 | A * | 3/1999 | Ikeda et al. ............... 429/231.8 |
| 6,008,138 | A * | 12/1999 | Laermer et al. ............ 438/725 |
| 6,097,138 | A * | 8/2000 | Nakamoto .................. 313/309 |
| 6,197,399 | B1 * | 3/2001 | Naito et al. ................ 428/64.1 |
| 6,250,984 | B1 | 6/2001 | Jin et al. |
| 6,264,741 | B1 | 7/2001 | Brinker et al. |
| 6,277,318 | B1 * | 8/2001 | Bower et al. ............... 264/346 |
| 6,277,740 | B1 * | 8/2001 | Goldstein ................... 438/660 |
| 6,280,697 | B1 * | 8/2001 | Zhou et al. ................. 423/414 |

(Continued)

FOREIGN PATENT DOCUMENTS

WO 98/39250 9/1998

(Continued)

OTHER PUBLICATIONS

Ajayan, P., et al., "Applications of Carbon Nanotubes", pp. 391-420, which is a series of: Dresselhaus, M.S., "Carbon Nanotubes, Synthesis, Structure, Properties, and Applications", Topics in Applied Physics, Springer-Verlag, 2000, vol. 80.

(Continued)

*Primary Examiner*—Katherine Bareford
(74) *Attorney, Agent, or Firm*—Jenkins, Wilson, Taylor & Hunt, P.A.

(57) ABSTRACT

A method for the self assembly of a macroscopic structure with a pre-formed nano object is provided. The method includes processing a nano object to a desired aspect ratio and chemical functionality and mixing the processed nano object with a solvent to form a suspension. Upon formation of the suspension, a substrate is inserted into the suspension. By either evaporation of the solvent, changing the pH value of the suspension, or changing the temperature of the suspension, the nano objects within the suspension deposit onto the substrate in an orientational order. In addition, a seed crystal may be used in place of the substrate thereby forming single-crystals and free-standing membranes of the nano-objects.

10 Claims, 7 Drawing Sheets

U.S. PATENT DOCUMENTS

| | | | |
|---|---|---|---|
| 6,297,592 B1 * | 10/2001 | Goren et al. | 315/3.5 |
| 6,334,939 B1 | 1/2002 | Zhou et al. | |
| 6,346,023 B1 * | 2/2002 | Tsuboi et al. | 445/46 |
| 6,352,758 B1 * | 3/2002 | Huang et al. | 428/143 |
| 6,422,450 B1 * | 7/2002 | Zhou et al. | 219/121.85 |
| 6,426,134 B1 | 7/2002 | Lavin et al. | |
| 6,593,166 B1 * | 7/2003 | Silverbrook | 438/99 |
| 6,686,308 B1 * | 2/2004 | Mao et al. | 502/180 |
| 6,692,791 B1 * | 2/2004 | Chang et al. | 427/77 |
| 6,878,361 B1 * | 4/2005 | Clarke et al. | 423/461 |
| 2001/0046564 A1 | 11/2001 | Kotov | |
| 2002/0172639 A1 * | 11/2002 | Horiuchi et al. | 423/447.2 |
| 2003/0012723 A1 * | 1/2003 | Clarke | 423/460 |
| 2003/0090190 A1 * | 5/2003 | Takai et al. | 313/311 |

FOREIGN PATENT DOCUMENTS

| | | |
|---|---|---|
| WO | WO98/39250 | 9/1998 |
| WO | WO 98/39250 A1 * | 9/1998 |
| WO | WO 01/03208 A1 * | 1/2001 |

OTHER PUBLICATIONS

Gao, B., "Fabrication and Electron Field Emission Properties of Carbon Nanotube Films by Electrophoretic Deposition", Advanced Materials, 2001, vol. 13, No. 23, pp. 1770-1773.

Choi, W.B., "Fully Sealed, High-Brightness Carbon-Nanotube Field-Emission Display", Applied Physics Letters, Nov. 1999, vol. 75, No. 20, pp. 3129-3131.

Harris, P., "Carbon Nanotubes and Related Structures", Cambridge University Press, 1999, pp. 1-5.

U.S. Appl. No. 09/296,572, Bower et al., filed Apr. 22, 1999.

U.S. Appl. No. 09/351,537, Bower et al., filed Jul. 1, 1999.

U.S. Appl. No. 09/679,303, Zhou et al., filed Oct. 6, 2000.

U.S. Appl. No. 09/817,164, Stoner et al., filed Mar. 27, 2001.

U.S. Appl. No. 09/881,684, Zhou et al., filed Jun. 18, 2001.

U.S. Appl. No. 09/996,695, Gao, filed Nov. 30, 2001.

Dresselhaus, M.S., "Carbon Nanotubes, Synthesis, Structure, Properties, and Applications", Topics in Applied Physics, Springer-Verlag, 2000, vol. 80.

Chinese Office Action for PCT/US2003/06345 dated Jul. 7, 2006.

* cited by examiner

Fig. 9A
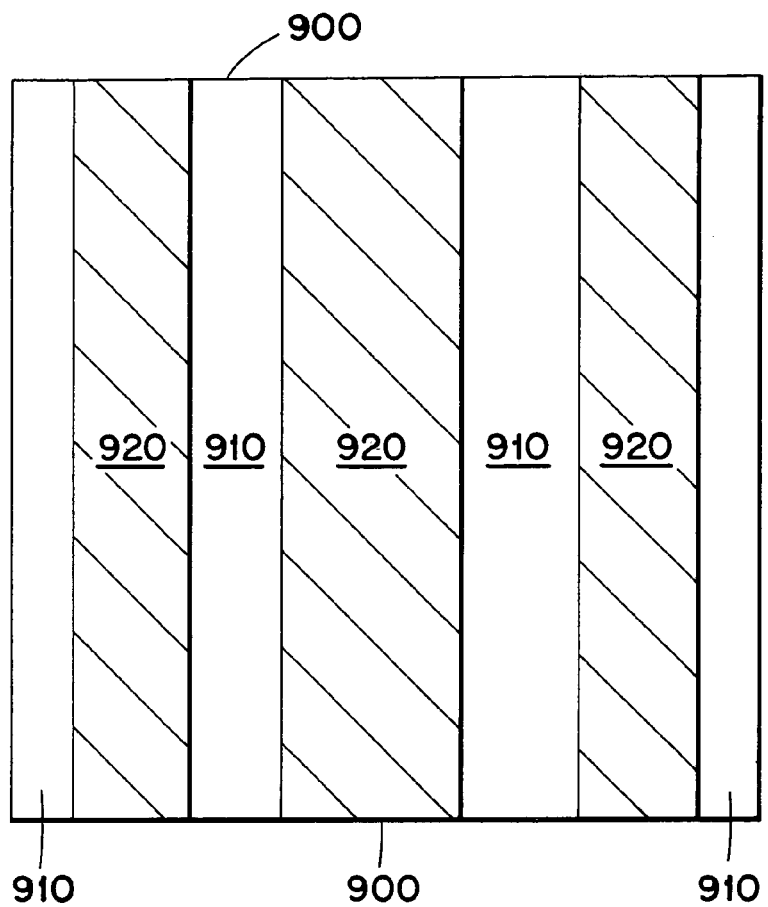
Fig. 9B
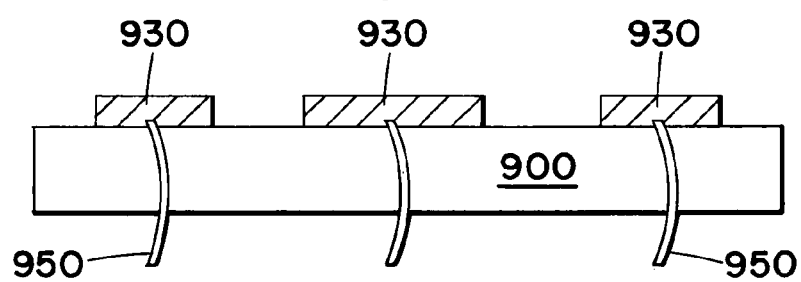
Fig. 9C
960

METHOD FOR ASSEMBLING NANO OBJECTS

STATEMENT REGARDING FEDERALLY SPONSORED RESEARCH OR DEVELOPMENT

At least some aspects of this invention were made with Government support under the sponsorship of the Office of Naval Research, Contract No. N00014-98-1-0597 and by a grant from the National Aeronautics and Space Administration (NAG-1-01061). The Government may have certain rights in this invention.

FIELD OF THE INVENTION

The present invention relates generally to methods to assemble nano objects into functional structures.

BACKGROUND OF THE INVENTION

In the description of the background of the present invention that follows reference is made to certain structures and methods. Such references should not necessarily be construed as an admission that these structures and methods qualify as prior art under the applicable statutory provisions. Applicants reserve the right to demonstrate that any of the referenced subject matter does not constitute prior art with regard to the present invention.

The term "nanostructure" material is used by those familiar with the art to designate materials including nanoparticles such as $C_{60}$ fullerenes, fullerene-type concentric graphitic particles; inorganic and organic nanowires/nanorods composed of either single or multiple elements such as Si, Ge, metals, oxides such as $SiO_x$, $GeO_x$; carbides such as silicon carbides; nitrides, borides, or hollow nanotubes composed of either single or multiple elements such as carbon, $B_xN_y$, $C_xB_yN_z$ $MoS_2$, and $WS_2$. One of the common features of nanostructure materials is the dimension of their basic building blocks. A single nanoparticle or a nanotube or a nanowire has a dimension that is less than 1 micron in at least one direction. These types of materials have been shown to exhibit certain properties that have raised interest in a variety of applications and processes.

U.S. Pat. No. 6,280,697 to Zhou et al. entitled "Nanotube-Based High Energy Material and Method," the disclosure of which is incorporated herein by reference, in its entirety, discloses the fabrication of carbon-based nanotube materials and their use as a battery electrode material.

Application Ser. No. 09/296,572 entitled "Device Comprising Carbon Nanotube Field Emitter Structure and Process for Forming Device" the disclosure of which is incorporated herein by reference, in its entirety, discloses a carbon nanotube-based electron emitter structure.

Application Ser. No. 09/351,537 entitled "Device Comprising Thin Film Carbon Nanotube Electron Field Emitter Structure," the disclosure of which is incorporated herein by reference, in its entirety, discloses a carbon-nanotube field emitter structure having a high emitted current density.

U.S. Pat. No. 6,277,318 to Bower et al. entitled "Method for Fabrication of Patterned Carbon Nanotube Films," the disclosure of which is incorporated herein by reference, in its entirety, discloses a method of fabricating adherent, patterned carbon nanotube films onto a substrate.

U.S. Pat. No. 6,334,939 to Zhou et al. (application Ser. No. 09/594,844) entitled "Nanostructure-Based High Energy Material and Method," the disclosure of which is incorporated herein by reference, in its entirety, discloses a nanostructure alloy with alkali metal as one of the components. Such materials are described as being useful in certain battery applications.

Application Ser. No. 09/679,303 entitled "X-Ray Generating Mechanism Using Electron Field Emission Cathode," the disclosure of which is incorporated herein by reference, in its entirety, discloses an X-ray generating device incorporating a nanostructure-containing material.

Application Ser. No. 09/817,164 entitled "Coated Electrode With Enhanced Electron Emission And Ignition Characteristics" the disclosure of which is incorporated herein by reference, in its entirety, discloses an electrode including a first electrode material, an adhesion-promoting layer and a carbon nanotube-containing material disposed on at least a portion of the adhesion promoting layer, as well as associated devices incorporating such an electrode.

Application Ser. No. 09/881,684 entitled "Method of Making Nanotube-Based Material With Enhanced Field Emission" the disclosure of which is incorporated herein by reference, in its entirety, discloses a technique for introducing a foreign species into the nanotube-based material in order to improve the emission properties thereof.

As evidenced by the above, nanostructure materials, such as carbon nanotubes, possess promising properties. Carbon nanotubes (CNTs) are one type of nano objects. CNTs are cylindrical carbon structures with a length between 0.1 μm and 100 μm and a diameter between 0.4 nm and 50 nm (see, e.g. M. S. Dresselhaus, G. Dresselhaus, and P. Avouris, eds. *Carbon Nanotubes: Synthesis, Structure, Properties, and Applications*. Topics in Applied Physics. Vol. 80. 2000, Springer-Verlag). CNTs can have either a single graphite shell per nanotube in which case CNTs are called single-wall carbon nanotubes (SWNTs). CNTs may also have concentric multi-shell graphite structures in which case CNTs are called multi-wall carbon nanotubes (MWNTs). Carbon nanotubes have exceptional mechanical properties with high elastic modulus, high ductility, high electrical and high thermal conductivity, thermal stability and chemical stability. CNTs are excellent electron field emitters since CNTs have a large aspect ratio and a sharp tip. (See, e.g. P. M. Ajayan and O. Zhou, in "*Topics in Applied Physics, 80*," M. S. Dresselhaus, G. Dresselhaus, and P. Avouris, Editors. 2000, Springer-Verlag). In particular, carbon-nanotube materials exhibit low emission threshold fields as well as large emission current densities. Such properties make them attractive electron field emitters for microelectronic applications, such as lighting elements, field emission flat panel displays, gas discharge tubes for over voltage protection and x-ray generating devices. Other applications of carbon nanotubes include but limited to: sensors, composites, shielding materials, detectors, electrodes for batteries, fuel cells, small conduction wires, small cylinders for storage, etc.

Carbon nanotubes, nanowires and nanorods, nanoparticles are typically fabricated by techniques such as laser ablation, arc discharge, and chemical vapor deposition methods. In some cases they can also be made via solution or electrochemical synthesis. However, in most cases, the as-synthesized materials cannot be utilized without further processing. For example, carbon nanotubes produced by the laser ablation and arc discharge techniques are in the form of porous mats and powders. Device applications require assembling these nano objects into ordered, patterned films, membranes, crystals on desired supporting surfaces and the pre-determined locations. In addition, it is often advantageous to assemble elongated nano objects such as the carbon nanotubes into orientationally ordered macroscopic structures which provide properties such as anisotropic electrical, mechanical, thermal, magnetic and optical properties.

The conditions used to assemble the nano objects need to be compatible with the conditions used for device fabrications. For example, nano objects which are to be used as field emission cathodes in field emission display should not have a fabrication temperature which exceeds the melting point of glass substrates (about 650° C.). Also, the temperature should be substantially lower when supporting surfaces of the nano objects are polymer. For such applications, direct growth of nano objects using chemical vapor deposition (CVD) techniques are not feasible since CVD techniques generally require relatively high temperatures (800° C.–1200° C.) as well as reactive environments. In addition, CVD techniques often result in defective multi-wall carbon nanotubes.

As such, a more desirable approach for fabrication of macroscopic structures of nano objects for applications is post-processing which includes synthesis of nano objects by arc discharge, laser ablation, or chemical vapor deposition techniques and assembly of these "pre-formed" nano objects into a macroscopic structure. Post-deposition processes that have been employed in the past include screen printing. (see, e.g. W. B. Choi, et al., Appl. Phys. Lett., 75, 3129 (1999)), spraying, and electrophoretic deposition (see, e.g. B. Gao et al. Adv. Mater., 13 (23), 1770, 2001) However, such techniques pose certain drawbacks. For instance, screen printing includes admixture of pre-formed nano objects with an organic or inorganic paste in order to form a thick paste. The thick paste is then placed on a substrate. After placement of the thick paste onto the substrate, the organic binder resides at an exposed surface of the paste. Therefore, an additional step is required to expose the nano objects within the thick paste. Typically, a plasma etching process or similar chemical process is used to expose the nano objects. In addition, the use of thick paste limits the size of a structure can be formed. In general it is difficult to form structures less than 20 microns–50 microns using the screen printing methods. Furthermore, screen printing methods requires considerable amount of materials. Spraying can be inefficient and is not practical for large-scale fabrication. Neither of these processes can control the orientation of the nano objects.

Therefore, a need exists for a process/method to assemble nano objects with a controlled structure, morphology, thickness, orientation, and ordering. In addition, a need exists for a method that operates at mild conditions acceptable for device fabrications. In addition, a need exists for an efficient and scalable assembly process.

SUMMARY OF THE INVENTION

The present invention provides a method for forming microscopic and macroscopic structures using nano objects. The method of the present invention allows self assembly of nano objects onto a supporting surface, into a freestanding structure, or into a crystal. In addition, the present invention provides a method for assembling the nano objects into patterned structures with a controlled thickness, density and a controlled orientation of the nano objects. In addition, the present invention provides an efficient process to assemble pre-formed nano objects under mild conditions that are acceptable for a wide range of substrates and devices. The resulting structures are useful in a variety of devices including electron field emission cathodes for devices such as field emission displays, cold-cathode x-ray tubes, microwave amplifiers, ignition devices; electrodes batteries, fuel cells, capacitors, supercapacitors; optical filters and polarizers; sensors; and electronic inter-connects.

In one embodiment of the present invention, a method for assembling a macroscopic structure with pre-formed nano objects is disclosed. The method comprises processing the nano objects such that they form a stable suspension or solution in a solvent. Once the nano objects are processed, the nano objects are admixed with a solvent to form a stable suspension or a solution. Upon formation of the stable suspension or solution, a substrate is submersed into the suspension or solution. Upon changing either the concentration, temperature, or pH value of the suspension, the nano objects deposit on the surface of the substrate.

In a further embodiment of the present invention, a method for assembling pre-formed nano objects into a patterned structure is disclosed. The method comprises processing pre-formed nano objects such that they form a stable suspension or solution in a suitable solvent. After processing the nano objects, the processed pre-formed nano object is mixed with a solvent to form a stable suspension or a solution. A patterned substrate is then inserted into the liquid. Upon changing either the concentration, temperature, or the pH value of the liquid, the nano objects assemble on certain regions of the substrate surface to form a patterned structure comprising the nano objects.

In yet another embodiment of the present invention, a method for assembling pre-formed nano objects into a crystal or a membrane is disclosed. The method comprises processing the nano objects so that they form a stable suspension or solution in a solvent. The processed nano objects are mixed with a solvent to form a suspension or a solution in a container that does not attract the nano objects. Upon changing a concentration, temperature or a pH value of the liquid, the nano objects crystallize in the liquid. In this embodiment of the present invention, a seed crystal may be used to form the crystal.

In another embodiment of the present invention, a method for assembling pre-formed nano objects into multi-layered structures is disclosed. The method comprises first processing the nano objects so that they form a stable suspension or solution in a solvent. The processed nano object is then mixed with a solvent to form a suspension or a solution. After formation of the stable suspension or solution, a substrate is submersed into the suspension or solution. Upon changing the concentration, temperature or the pH value of the suspension or solution, the nano objects assemble on the surface of the substrate. The substrate is then removed from the suspension or solution. After removal, a second type of material is coated on the surface of the self-assembled nano objects on the substrate. The substrate is then submersed into the suspension or solution containing the nano objects. The process is repeated until a multi-layer structure with a desired thickness and number of repeating layers are obtained.

In yet another embodiment of the present invention, a method for assembling elongated nano objects into orientational ordered structures is disclosed. The method comprises forming a stable suspension or solution of the nano objects in a suitable solvent. A substrate is then submersed into the liquid and the solvent gradually evaporated. Upon evaporation of the solvent, the nano objects deposit on the surface of the substrate such that longitudinal axes of the nano objects align parallel to the substrate surface. The process can further comprise the use of an external field such as either an AC or a DC electrical field or a magnetic field during the assembly process.

In a further embodiment of the present invention, a method for assembling elongated nano objects into a vertically aligned structure on a supporting surface is disclosed. The method comprises first processing the nano objects such that a tail and a body of the nano objects have different affinities toward certain types of solvents. For example, the tails are hydrophobic and the bodies are hydrophilic. The processed nano objects are dispersed in a suitable solvent where the solvent has an affinity towards the tails of the nano objects. A substrate with one of the surfaces having the same affinity towards the solvent and the tails of the nano objects is submersed into the liquid. Upon changing the concentration, temperature, or pH value of the solvent, the nano objects deposit on the substrate with their tails bonded to the surface and longitudinal axes of the nano objects vertically aligned with respect to the surface of the substrate.

As may be appreciated, the present invention provides a method for self assembly of nano objects, such as carbon nanotubes, nanowires and nanorods, onto a substrate, into free-standing membranes, into a crystal, or a into multi-layer structure. The nano objects form into functional structures having long range ordering. In addition, the present invention provides a method for controlling the functionality of formed macroscopic structures.

BRIEF DESCRIPTION OF THE DRAWING FIGURES

Objects and advantages of the invention will become apparent from the following detailed description of preferred embodiments thereof in connection with the accompanying drawings in which like numerals designate like elements and in which:

FIG. 9A illustrates a glass substrate patterned with photoresist and hydrophilic regions in accordance with an embodiment of the present invention.

FIG. 9B illustrates an embodiment of the present invention where the substrate shown with respect to FIG. 9A includes a SWNTs.

FIG. 9C shows a phosphor screen for placement over the glass substrate shown with reference to FIG. 9B in accordance with an embodiment of the present invention.

DETAILED DESCRIPTION OF PREFERRED EMBODIMENTS

The present invention discloses a method for assembling nano objects. The nano objects formed in accordance with the present invention may be formed onto a supporting surface, into free-standing membranes and into multi-layer structures. The nano objects may be a variety of materials, including hollow nano tubes which are composed of single or multiple elements. The single or multiple elements may be carbon, boron, nitrogen, solid inorganic or organic nanowires/nanorods. Prior to assembling the nano objects, the nano objects are processed such that they form a stable suspension or a solution in a suitable solvent. The processing operation includes attaching chemical groups to the surface of the nano objects and reducing aspect ratios of elongated nano objects. After processing, a suspension or a solution is formed by admixture of the processed nano objects with a solvent. Upon formation of the suspension, a substrate, such as glass, is submersed into the substrate. After submersion of the substrate, the nano objects self assemble into uniform thin films on the substrate. The nano objects self assemble when either of the following occur: evaporation of the suspension, a concentration change of the suspension, a temperature change of the suspension or a pH level change of the concentration. The nano objects which self assemble onto the uniform film may be any nano object, such as carbon nanotubes, silicon nanowires or the like.

Figure 1A:
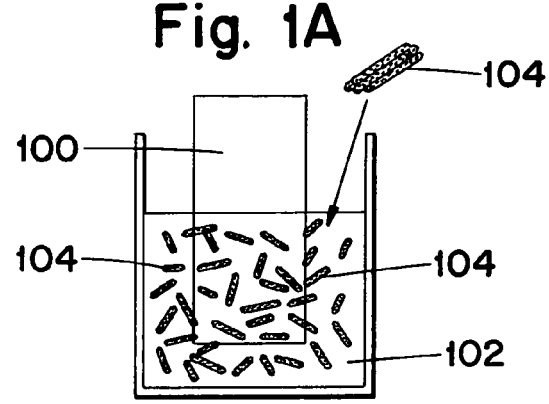
FIG. 1A illustrates a substrate within a suspension where the suspension includes nano objects for deposition onto the substrate in accordance with an embodiment of the present invention.

Now making reference to the Figures, and more particularly FIG. 1A, FIG. 1A illustrates a substrate 100 within a suspension 102 having nano objects 104, in accordance with an embodiment of the present invention. The substrate 100 may be any substrate which allows deposition of nano objects such as carbon nanotubes onto the substrate, such as hydrophilic glass, gold (Au), a silicon wafer, aluminum, chromium, tin, a polymer, a metal or the like. In accordance with an alternative embodiment of the present invention, the substrate may include regions with alternating chemical properties such as hydrophilic and hydrophobic regions, as shown in greater detail with reference to FIG. 1B.

Figure 1B:
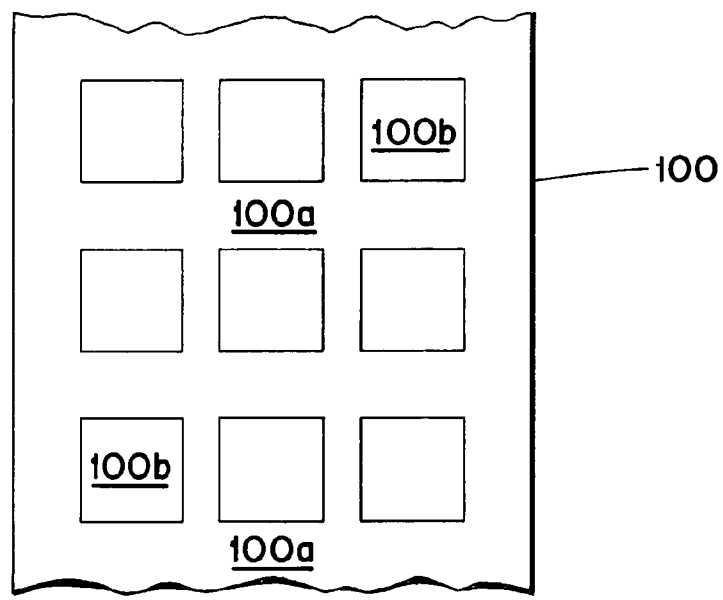
FIG. 1B shows an embodiment of the present invention where the substrate shown with reference to FIG. 1A includes hydrophobic regions and hydrophillic regions.

FIG. 1B illustrates an embodiment of the present invention where the substrate 100 includes hydrophobic regions 100a and hydrophilic regions 100b. In this embodiment, the nano objects deposit on one of these regions. Where the nano objects deposit depend on the properties of the nano objects and how they are processed. In the case where nano objects are hydrophilic, the nano objects deposit on the hydrophilic regions 100b and resist the hydrophobic regions 100a during deposition. Therefore, a user may control deposition formation on a substrate and functionality of the substrate by controlling the location of hydrophillic and hydrophobic regions on the surface of the substrate. As may be appreciated, controlling the functionality of the substrate enables the fabrication of patterned nano object films. It should be noted that the hydrophobic regions 100a may be formed using any suitable technique, such as spin coating a thin layer of hydrophobic polymers such as polystyrene over the surface of the substrate 100, by deposition of a monolayer of hydrophobic chemical groups or the like. Moreover, after nano object deposition, the hydrophobic regions 100a may be removed by washing the substrate 100 in any suitable solvent, such as acetone, methanol, ethanol, buffered hydroflouric acid or the like. Therefore a user may pattern the substrate such that the formed carbon nanotube film may have different uses, such as the basic field emission pixels for field emission displays.

Returning attention to FIG. 1A, the substrate 100 is submersed into the suspension 102. The suspension 102 includes nano objects 104 admixed with suitable solvents. In the case of processed carbon nanotubes, the solvent can be either de-ionized water or alcohol. Some of the nano objects 104 may be dispersed or dissolved in a suitable solvent after fabrication without further processing. Other materials, such as carbon nanotubes or Si nanowires, are processed in order to form a stable suspension. The processing operation includes the following: attaching chemicals to the surfaces of the nano objects and/or reducing the aspect ratios of the elongated nano objects. In one embodiment of this invention, the the nano objects 104 are single-wall carbon nanotube (SWNT) bundles which are produced by either arc-discharge, laser ablation, or other suitable techniques. They are then purified by a refluxing operation in hydrogen peroxide and filtration. After purification, the nano objects 104 are etched to uniform lengths. The nano objects 104 can be cut by a variety of techniques including sonication in concentrated acids such as sulfuric and nitric acids, or a mechanical process such as ball-milling or mechanical cutting. Upon etching, the SWNT bundles are rinsed in de-ionized water and annealed at 200° C. in a $10^{-6}$ torr dynamic vacuum. The etching operation changes a morphology of the SWNT bundles from highly entangled to a rigid-rod structure after reducing the aspect ratio of the SWNT bundles to less than 100. In one embodiment of the present invention, SWNT bundles processed for 30 hours had an indicated bundle length of 0.5 μm. Moreover, the etched SWNTs are metallic like and have less than 2.0% hydrogen (H). In addition, the above method used for processing the SWNT bundles maintains the frequency of a Raman-active SWNT breathing mode at a same amount while reducing the aspect ratio and changing the morphology of the SWNT bundles. In accordance with an alternative embodiment of the present invention, the nano objects 104 may also be multi-walled nano tube bundles and nanowires/nanorods.

Upon processing to the form of the nano objects, the nano objects 104 are admixed with a solution such as de-ionized water to form the suspension 102. In this embodiment, when the nano objects 104 are carbon nanotubes etched using the method described above, the nano objects 104 and the de-ionized water admix to form a homogeneous suspension which is stabilized with a carbon nanotube concentration up to 1.0 mg/mL without flocculation for several days. In accordance with alternative embodiments of the present invention, other solvents, such as alcohol, may also be used in the suspension 102.

Figure 2:
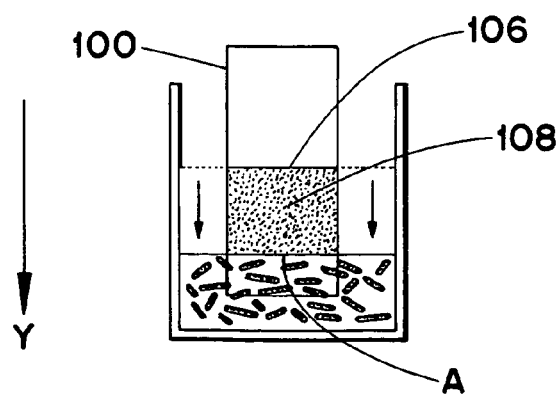
FIG. 2 illustrates the evaporation of the suspension during submersion of the substrate shown with respect to FIG. 1A in accordance with an embodiment of the present invention.
Figure 3:
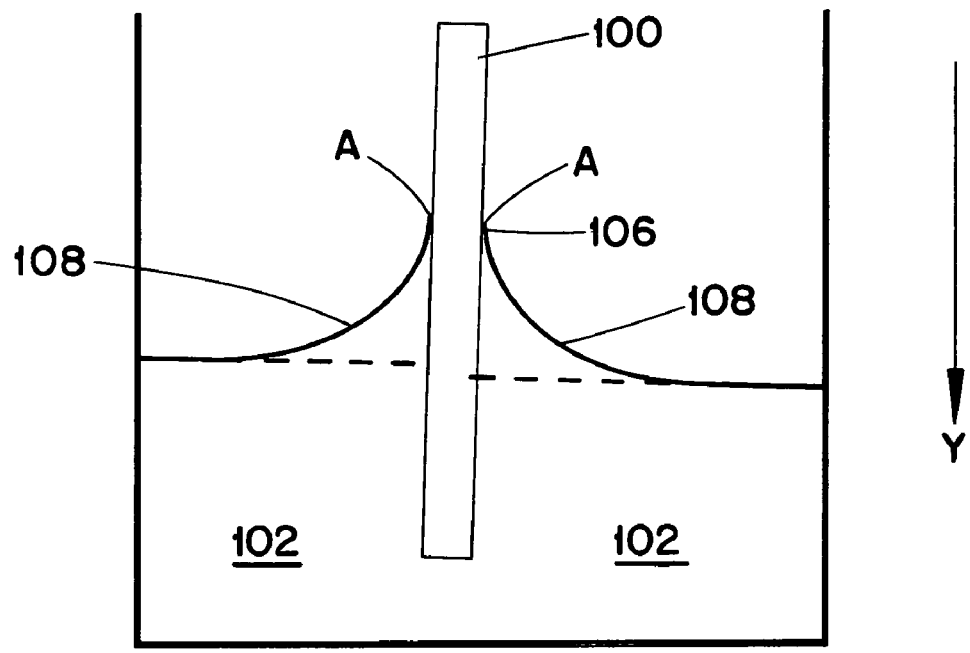
FIG. 3 is an embodiment of the present invention illustrating a air/liquid/substrate triple line on the substrate shown with respect to FIG. 1A where nano objects deposit on the substrate along the air/liquid/substrate triple line.

Upon insertion of the substrate 100 into the suspension 102, the solvent 102 evaporates as shown with reference to FIG. 2. FIG. 2 illustrates the evaporation of the suspension 102 during submersion of the substrate 100 in accordance with an embodiment of the present invention. As may be seen with reference to the Figure, the nano objects 104 transfer to the substrate as the suspension 102 evaporates. In some cases, deposition occurs along an air/liquid/substrate line or triple line 106, as shown with reference to FIG. 3. In accordance with an embodiment of the present invention, the triple line 106 is an area on the substrate 100 where the suspension 102 ends on the substrate 102 as indicated by a point A. As may be appreciated, the point A moves in a downward direction Y along the substrate 100 as the suspension 102 evaporates. It should be noted that the rate of evaporation may be controlled through controlling the ventilation of an area immediately surrounding the substrate 100 and the suspension 102 and increasing or decreasing the temperature of the suspension 102. It should also be noted that in an embodiment of the present invention, the suspension evaporates at room temperature.

Figure 4:
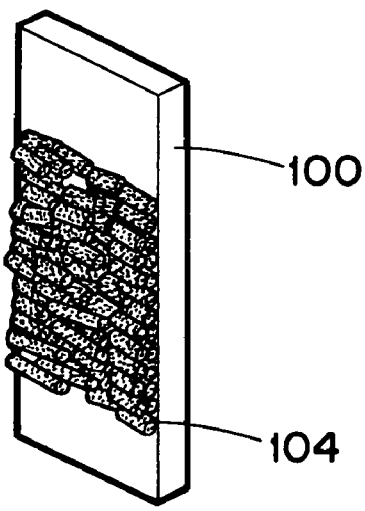
FIG. 4 illustrates the deposition of nano objects onto a substrate to form a nano object film, in accordance with an embodiment of the present invention.

Now turning attention to FIG. 4, FIG. 4 illustrates the deposition of the nano objects 104 onto the substrate 100 to form a macroscopic structure, such as a film 108 in accordance with an embodiment of the present invention. As the triple line 106 moves in the downward direction Y (shown with reference to FIG. 3), the nano objects 104 continue to deposit on the substrate 102 forming the film 108. In this embodiment, the film 108 has a uniform thickness, as demonstrated by the image shown in FIG. 1, which varies in a range between about 1 nm to about 10 microns. The thickness of the deposited film may be controlled through controlling the concentration of the nano objects 104 in the suspension 102. To further illustrate, for a carbon nanotube film thickness of 0.1 micron, a concentration in a range preferably between about of 0.2 mg/mL of nanotube/water and about 0.5 mg/mL of nanotube/water suspension may be used. When a carbon nano object film having a thickness of 1.0 micron is desired, a concentration preferably in a range between about 0.5 mg/mL and about 1 mg/mL may be used.

It should be noted that carbon nanotube film deposition occurs for the film 108 when the suspension 102 is super saturated. To further illustrate, when a concentration $C_o$ of the suspension 102 is less than a critical concentration $C^*$ of the suspension 102, deposition occurs during evaporation of the suspension, as previously described. For example, if the concentration $C_o$ of the suspension is 0.5 mg/mL and the critical concentration $C^*$ of the suspension 102 is 1 mg/mL deposition occurs at the triple line 106. Nonetheless, if the concentration $C_o$ of the suspension 102 is substantially smaller than a critical concentration of the suspension, even when the suspension 102 has a high evaporation rate (i.e., an evaporation rate of 1 mm/hour), the nano objects 104 may not deposit on the substrate. For example, when Co<0.1 mg/mL and Co=1 mg/mL, no deposition of SWNTs occurs on the glass substrate.

The nano objects 104 in the self-assembled film 108 are orientational ordered such that longitudinal axes of the nano objects 104 which deposit on the substrate 100 lie along the triple line 106 direction. This is demonstrated in FIG. 4, which shows a TEM image of the aligned SWNT bundles after assembly. Moreover, a degree of ordering of the nano objects in the film 108 maybe controlled by length and length distribution of the nano objects 104 and the thickness of the film 108 deposited on the substrate 100. To further illustrate, when the nano objects 104 are preferably in a range between about 0.01 μm and about 1 μm with a thin deposited film 108 in a range preferably between about 10 nm and about 1 micron, the film 108 has a higher degree of ordering. Furthermore, if the nano objects 104 are longer (i.e. 2 μm or more in length), a nano object film having a polycrystalline structure tends to form with well-ordered domains and partial alignment of neighboring domains.

Upon formation, the carbon nanotube film 108 displays anisotropic polarization of individual carbon nanotubes. The individual carbon nanotubes also demonstrate long-range orientational ordering. As those skilled in the art will appreciate, the electrical conductivity of the film 108 is higher when measured parallel to the alignment direction as opposed to being perpendicular with the alignment direction.

In addition, the substrate 100 may have a plurality of shapes in addition to the planar configuration shown with respect to the Figures. For example, the substrate 100 may also include a curved surface, a sandwich structure or the like. In embodiments where a multi-planar substrate is used, electrophoresis may be used to deposit the film 108 onto the substrate 100, as more fully discussed with reference to commonly owned application Ser. No. 09/996,695 filed on Nov. 30, 2001, the specification of which is herein incorporated by reference in its entirety.

One advantage of present invention includes strong bonding and selectivity of the nano objects 104 to the substrate 100. The nano objects 104 are both mechanically and chemically stable in certain solvents. The stability and selectivity of the self assembled nano objects are attractive from a fabrication standpoint and for use in device applications. To further illustrate, when nano tubes are carbon nanotubes and a substrate which includes glass and chromium is used, the nano objects bond strongly to the substrate. In this example, the nano objects may not be removed by mechanical scratching or through the use of a solvent such as acetone. Nonetheless, the nano objects may be removed by washing or sonication in water. When the nano objects are removed through the use of water, water is stirred into a suspension, such as the suspension 102, and the nano objects, such as the film 108, separate into smaller free standing membranes which float on a surface of the water.

Figure 5:
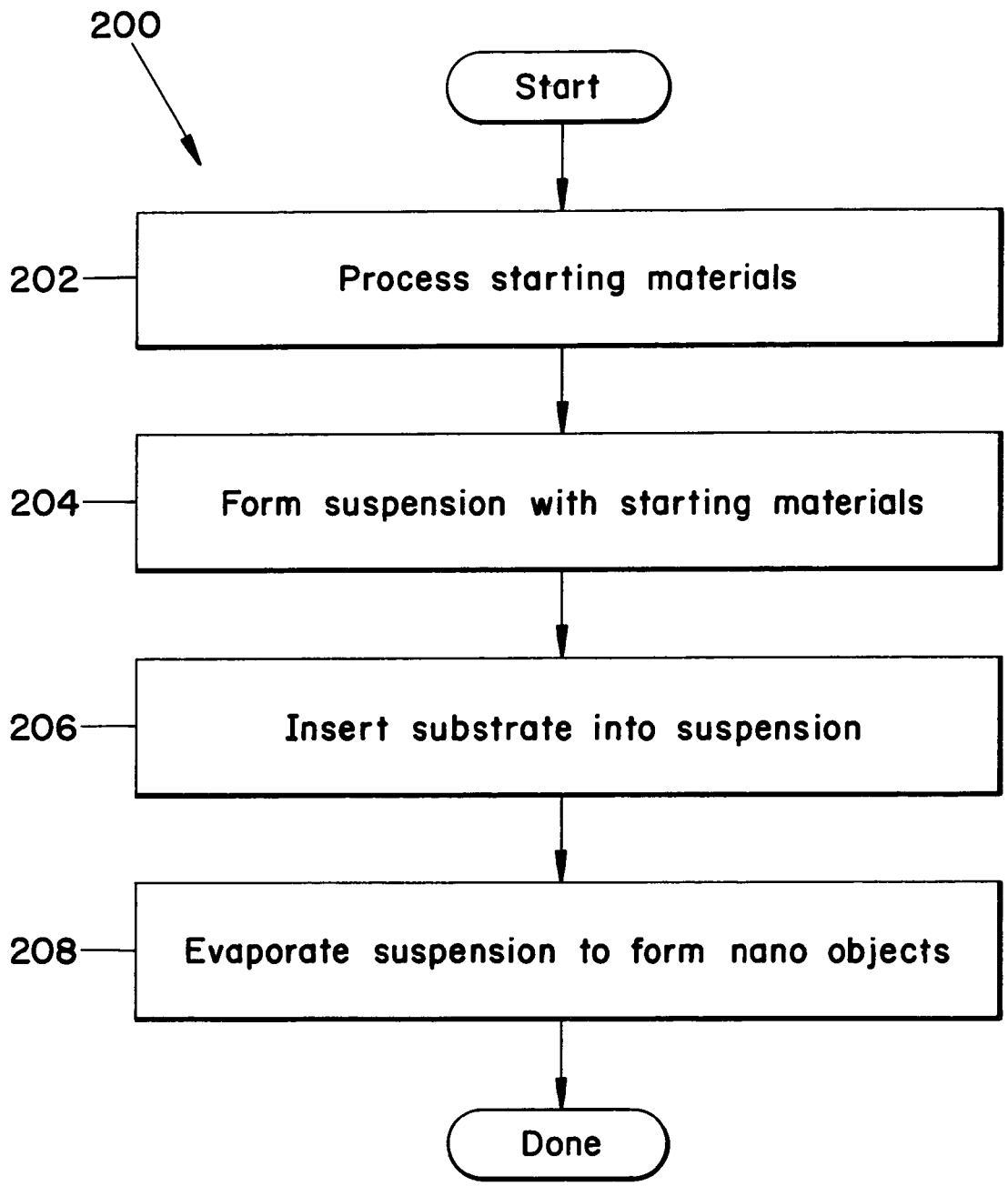
FIG. 5 illustrates a method 200 assembling a macroscopic structure with pre-formed carbon nanotubes onto a substrate in accordance with an embodiment of the present invention.

Now making reference to FIG. 5, FIG. 5 illustrates a method 200 for assembling a macroscopic structure with pre formed carbon nanotubes onto a substrate in accordance with an embodiment of the present invention. Initially, in an operation 202, starting materials used for forming the macroscopic structures are processed. For example, turning attention to FIG. 1A and both the suspension 102 and the nano objects 104 shown with respect to the Figure, prior to forming the suspension 102, a user processes the nano objects 104 and the substrate 100. During the operation 202, the SWNT bundles 104 are etched to controlled lengths by sonication in concentrated sulfuric and nitric acids after purification by reflux in hydrogen peroxide and filtration. Upon etching, the SWNT bundles are rinsed in de-ionized water and annealed at 200° C. in a $10^{-6}$ torr dynamic vacuum to form the nano objects 104. It should also be noted that if the user desires to pattern the carbon nano object film deposition onto a substrate, the user patterns hydrophobic regions and hydrophilic regions onto the substrate, as discussed with reference to FIG. 1B and the substrate 100. Once a user processes the starting materials to be used for the formation of the carbon nano object film, an operation 204 is performed, as shown with reference to FIG. 5.

During the operation 204, the suspension is formed with the starting materials. The user admixes the processed starting materials at a given concentration with a solution in order to form the suspension. Returning to the example and FIG. 1A, the user admixes the nano objects 104 with de-ionized water such that the concentration of the nano objects 104 within the suspension 102 is 1.0 mg/mL in this example. Upon formation of the suspension with the starting materials, the method 200 performs an operation 206.

During the operation 206, a user inserts a substrate into the suspension. Once the user inserts the substrate into the suspension, an operation 208 is performed. During the operation 208, the suspension evaporates, thereby forming a nano object film on a surface of the substrate. Turning back to the example and FIG. 2, upon submersion of the substrate 100 into the suspension 102 in the operation 206, the suspension 102 begins evaporation in the operation 208. As previously discussed, as the suspension 102 evaporates, the film 108 deposits on the substrate 100, thereby forming a macroscopic structure with the preformed nano objects 104 in accordance with an embodiment of the present invention. In one embodiment of the present invention, the substrate 100 may be annealed in a vacuum at a temperature in a range preferably between 100° C. and about 500° C.

Figure 6A:
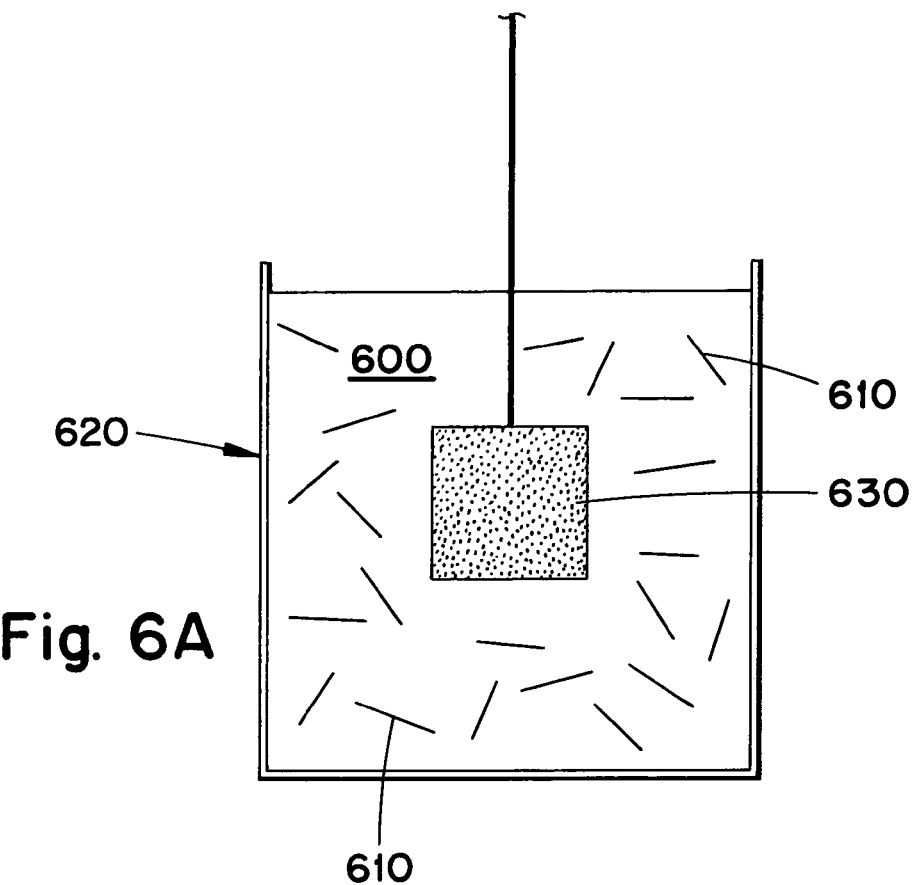
FIG. 6A illustrates a method of submersing a seed crystal into a solution for assembling nano objects into a crystal in accordance with an embodiment of the present invention.
Figure 6B:
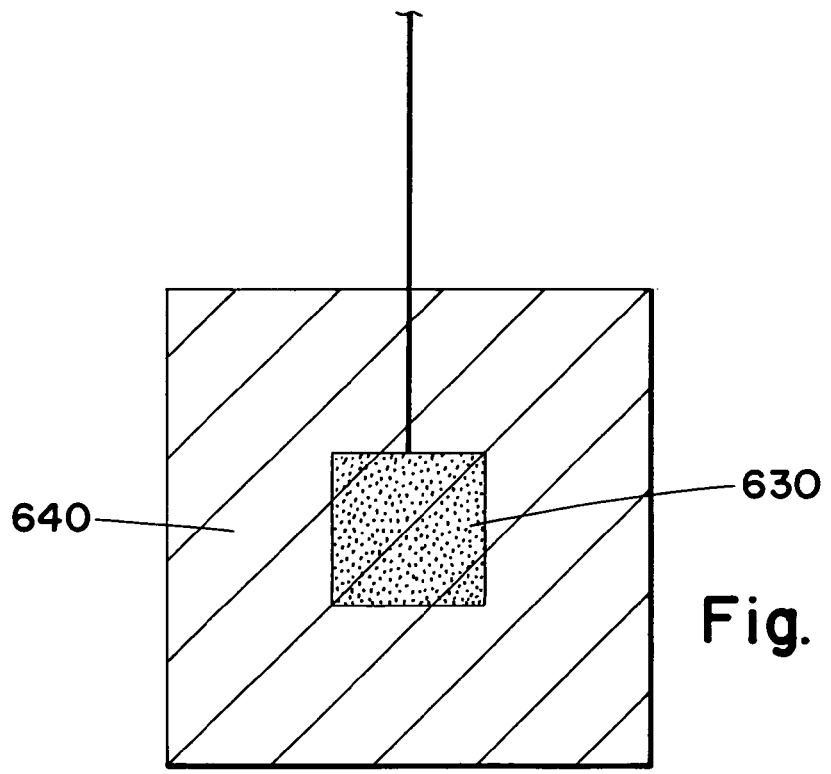
FIG. 6B is an embodiment of the present invention illustrating the formation of a crystal formed with the nano objects shown with reference to FIG. 6A.

Now making reference to FIG. 6A, FIG. 6A illustrates a method for assembling pre-formed nano objects into a crystal or a membrane in accordance with an embodiment of the present invention. The method comprises processing the nano objects so that they form a stable suspension or solution in a suitable solvent as discussed earlier. A processed nano object 610 is mixed with a solvent 600 to form a suspension or a solution in a container 620 that does not attract the nano objects 610, such as TEFLON or the like if the nano objects are hydrophilic. Preferably, a seed crystal 630 comprising the same nano objects or similar materials as the nano object 610 is either submersed in the solution or touches the surface of the solution. When the processed nano objects 610 are carbon nanotubes, the solvent 600 can be water and preferably de-ionized water. The temperature or the pH value of the suspension or solution is changed after contact of the seed crystal 620 with the solution to bring it to super-saturation. The nano objects assemble in the liquid or around the seed crystal 630 to form a crystal 640 (shown with reference to FIG. 6B). It should be noted that when a seed crystal is used, the seed crystal may be slowly withdrawn from the solution such that nano objects in the solution assemble around a lower surface of the seed crystal 630. The nano objects 610 assemble around the seed crystal 630 thereby forming a crystal 640, as shown with respect to FIG. 6B. The nano objects 610 form around the seed crystal 630 such that a structure of the crystal 640 is the same as a structure of the seed crystal 630. Additionally, the crystal 640 may have a thickness in a range preferably between about 1 nanometer and about 10 microns. Moreover, the area of the freestanding membrane is in a range between 1 micron×1 micron and 10 cm×10 cm.

Figure 7A:
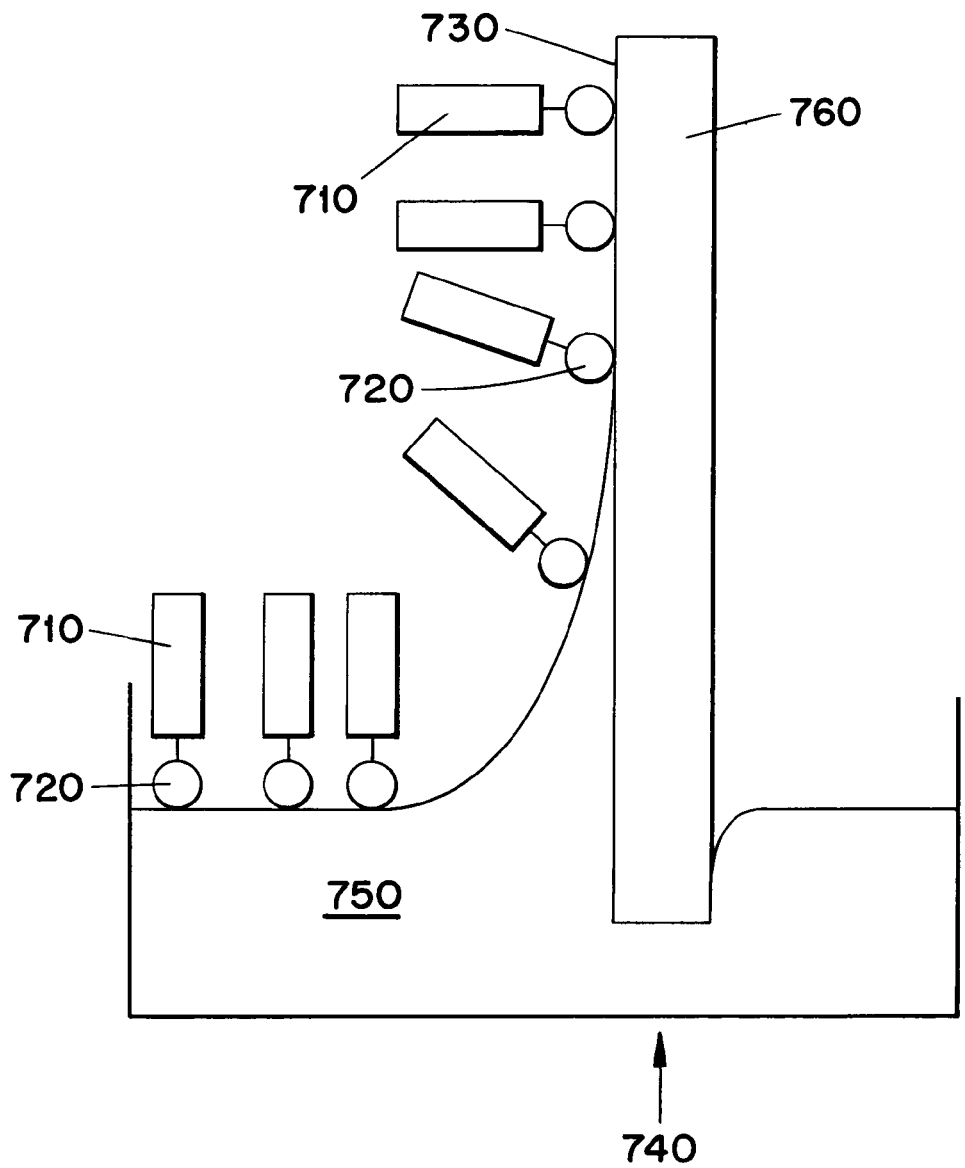
FIG. 7A illustrates a method of assembling elongated nano objects on a surface such at they are aligned vertically in respect to the supporting surface in accordance with an embodiment of the present invention.
Figure 7B:
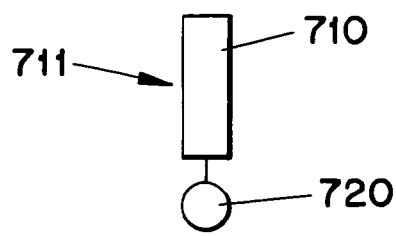
FIG. 7B shows nano objects shown with respect to FIG. 7A in accordance with an embodiment of the present invention.

In a further embodiment of the present invention, nano objects may be formed in a vertical structure, as shown with reference to FIG. 7A. FIG. 7A illustrates a method for vertically aligning nano objects 711 into a vertically aligned structure on a substrate surface 760. In this embodiment, nano objects 711 are processed such that the nano objects 711 have a tail 720 and a body 710 which have different affinities toward certain types of solvents. For example, the tails 720 are hydrophobic and the bodies 710 are hydrophilic. In an embodiment of the present invention, the tails 720 may be a chemical group comprising_hydrocarbons such as C17H35. Additionally, the bodies 710 may be a chemical group comprising_carboxylic acid —CO2H. The processed nano objects 711 are dispersed in a solvent 750 which attracts the tail 720 but repels the bodies 710 of the nano objects 711. As such, the nano objects float on a surface of the solvent 750 and more preferably with the tails 720 in contact with the solvent and bodies 710 away from the solvent 750. An example of a solvent which may be used when the tail 720 is composed of hydrocarbons is toluene or the like. It is also possible through applying pressure or external electrical or magnetic field to assist with the assembly of the nano objects 711 on the surface of the solvent 750.

Upon dispersion of the nano objects 711 within the solvent 750, a substrate 760 with a surface 730 having the same affinity as the tails 720 is submersed into a container 740 that includes the solvent 750. After submersing the substrate 760 into the solvent 750, the substrate 760 is withdrawn from the solvent 750. Upon withdrawing the substrate 760 from the solvent 750, the nano objects 711 deposit on the substrate 760 with the tails 720 bonded to the surface 730 and longitudinal axes of the nano objects 711 vertically aligned with respect to the surface 730 of the substrate 760.

In one example, the nano objects 711 can be carbon nano tubes made hydrophilic by oxidation in acid. A hydrophobic chemical group can be attached to the ends of the carbon nano tubes 711 that are open after the oxidation process. In this example, the substrate may be glass coated with a layer of hydrophobic chemicals such that the carbon nano tubes vertically align with the structure. The vertically aligned structure is useful, for example, as sensors which detect biological systems, chemicals or gases. The vertically aligned structure may also be useful as an electron field emission cathode. It should be noted that it is also possible to make bodies of carbon nanotubes hydrophobic and tails of carbon nanotubes hydrophilic. A vertically aligned structure can also be formed using this type of carbon nanotube. In addition, in this embodiment, the solvent 650 may be hydrophilic. Thus, the hydrophilic tails attach to the surface 730 such that longitudinal axes of the nano objects are perpendicular to the surface 730.

Figure 8A:
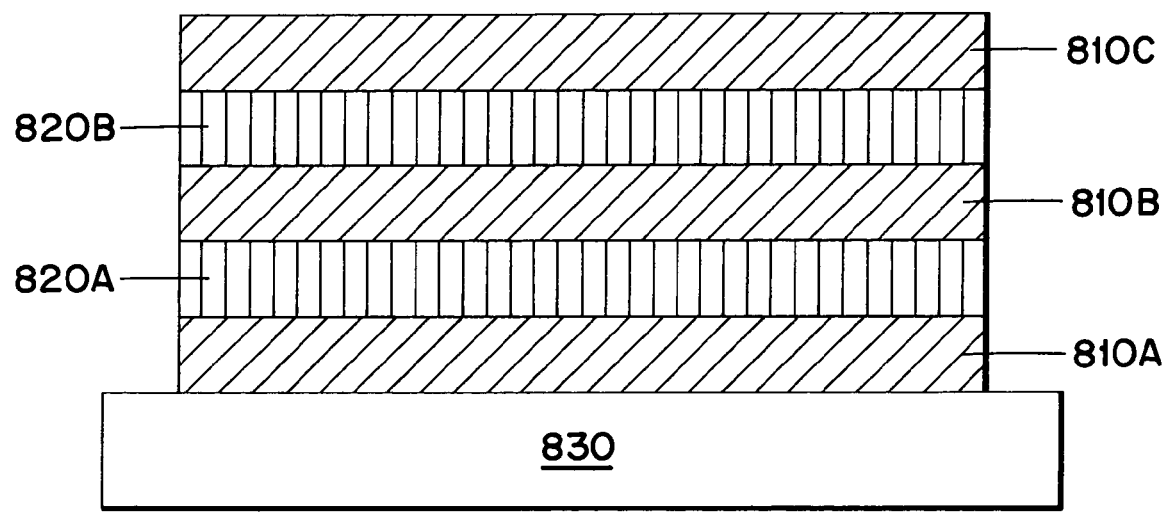
FIG. 8A illustrates a multi-layer structure fabricated in accordance with an embodiment of the present invention.

Now turning attention to FIG. 8A, FIG. 8A discloses assembled preformed nano objects which form a multi-layered structure in accordance with an embodiment of the present invention. A self-assembled nano object film 810A is first deposited on a substrate 830. After deposition, the substrate 830 is removed from a solution having nano objects which formed the self-assembled nano object film 810A. A second material 820A is then coated on the surface of the self-assembled nano objects 810A on the substrate. The second material may be coated onto the self assembled nano object film 810A using a variety of techniques such as spin-coating, spray, electrophoresis, evaporation or sputtering. The material 820A has the same affinity to the self-assembled nano object film 810A as a surface of the substrate. An example of the type of material which may be used for the material 820A includes polymers, metals, ceramics, semiconductors, inorganic materials, organic materials, biological materials or the like.

Figure 8B:
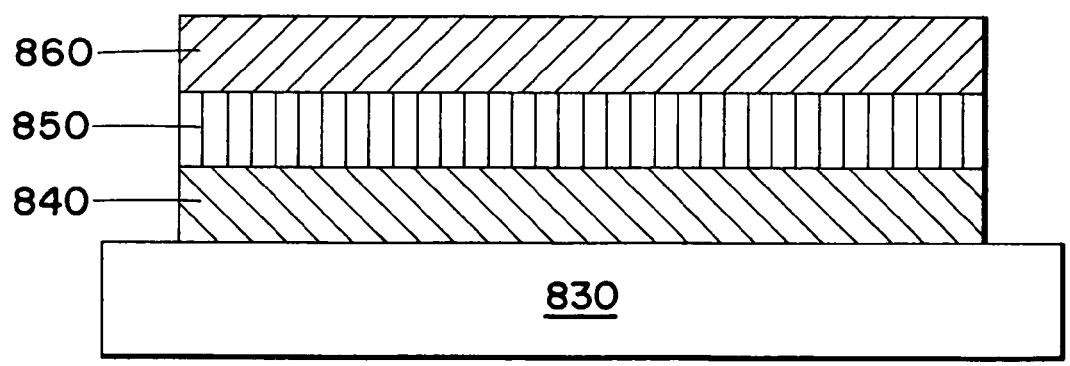
FIG. 8B shows a tri-layer multi-layer structure made in accordance with an embodiment of the present invention.

The substrate 830 is re-submersed into the solution containing the nano objects to form a nano object film 810B similar to the nano object film 810A. The process is repeated until a multi-layer structure with a desired thickness and a desired number of repeating layers, e.g., layers 820B and 810C, are obtained as shown with reference to FIG. 8A. Alternatively, a third material 860 can be deposited on top of the second layer 850 to form a tri-layer structure as shown with respect to FIG. 8B, the structure of which may be used as a thin film re-chargeable battery.

A first layer electrode of the re-chargeable battery is carbon nanotubes 840 which are deposited on a conducting surface 830. The second layer 850 is an electrolyte material that can be deposited over the carbon nanotubes 840 using any suitable technique such as evaporation, pulsed laser deposition, sputtering or the like. A third layer 860 is a second electrode of the rechargeable battery which can be $Li_xMnO_4$ or $Li_xCO_2$. The third layer 860 can be deposited by any suitable technique including evaporation, pulsed laser deposition, sputtering or the like. The multi-layer structure can then be used as a re-chargeable battery or as a fuel cell.

In another embodiment of this invention, carbon nanotubes are assembled into a structure which can be used as an electron field emission cathode for applications such as field emission flat panel displays. SWNTs are first synthesized by the laser ablation method and then raw materials are purified. The average bundle length is then reduced from >10 μm to ~0.5 μm by, for example, sonication in a mixture of $HNO_3$ and $H_2SO_4$ for 30 hours. The short SWNTs are then rinsed in deionized water and annealed at 200° C. in $10^{-6}$ torr dynamic vacuum before use. A homogeneous suspension of shortened SWNTs is stabilized in de-ionized water at a nanotube concentration of 1.0 mg/mL.

Now making reference to FIG. 9A, FIG. 9A illustrates a patterned substrate 900 in accordance with an embodiment of the present invention. Initially, a thin layer of photoresist is spin-coated onto a top surface of the glass slide 900. A photo mask with periodic lines (less than 100 micron width) is placed on top of the glass surface coated with the photoresist. After placement of the photo mask over the glass surface, an ultraviolet light source is used to expose the glass. The exposed glass is then developed in chemicals to remove the photoresist materials that are exposed to UV light. The developed glass forms a patterned glass substrate with periodic hydrophobic regions which are covered by the photoresist 910 and hydrophilic regions 920 which are free of the photoresist. The glass with patterned hydrophobic and hydrophilic regions is submersed into the previously described SWNT/water suspension at room temperature. It should be noted that SWNTs having an aspect ratio preferably of about 10 and a bundle length in a range preferably between about 300 nm and about 1 micron may be used. As the water evaporates, SWNTs 930 deposit on the hydrophilic region of the glass slide.

In a next operation, the glass slide coated with the SWNTs 930 is washed in a suitable solvent such as acetone, methanol, ethanol, buffered hydrochloric acid or the like. During the washing process, the remaining photoresist is removed and the SWNTs 930 remain on the glass surface. After removing from the remaining photoresist, the glass slide is heated in either air or vacuum at 200° C. to remove the residual solvent to achieve SWNTs 930, as shown with reference to FIG. 9B. The width of the SWNTs 930 can be as small as 0.1 micron and as wide as 1 cm or larger. It should be noted that the SWNTs 930 may have other patterns in addition to that shown with reference to FIG. 9B, such as squares, circles, dots or any other geometry that can be patterned by photolithography.

Electrical contacts 950 are coupled with each of the SWNTs 930 on the glass substrate 900 as shown with reference to FIG. 9B. When the structure shown with respect to FIG. 9B is placed inside a vacuum system and subjected to an electrical field in the order of 1–10V/micron, electrons emit from the carbon nanotubes 930. When a phosphor screen 960 (FIG. 9C) is placed above the carbon nanotube structure, images can be obtained by controlling where the electrons emit and at which location the electrons strike the phosphor thereby forming a field emission flat display. It should be noted that a field emission cathode formed in accordance with the present invention may have a threshold electrical field in a range between about 1V/micron to about 5V/micron for an emission current density of 1 $mA/cm^2$.

The present invention provides a method for the self assembly of pre-formed nano objects onto a substrate. As may be appreciated, the present invention allows for higher packing densities than those techniques used in the prior art. Forming nano structures with filtration techniques form nanotube papers which have a lower packing density than that of nano structures formed in accordance with the present invention. In addition, the present invention may be performed at room temperature as previously mentioned. The efficient room temperature deposition process provides an attractive alternative to chemical vapor deposition techniques, more specifically in display applications having low melting temperatures.

Variations of the above-described exemplary method, as well as additional methods, are evident in light of the above-described devices of the present invention. Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method for assembling a macroscopic structure with elongated nano objects, the method comprising:
    (a) processing the elongated nano objects such that tails of the elongated nano objects are hydrophobic and bodies of the elongated nano objects are hydrophilic;
    (b) admixing the processed elongated nano objects in a suitable hydrophobic solvent to form a suspension, the suspension having a concentration, a temperature and a pH level;
    (c) submersing a hydrophobic substrate into the suspension;
    (d) changing either the concentration, temperature or the pH value of the suspension thereby assembling the elongated nano objects on a surface of the substrate, wherein the tails of the elongated nano objects attach to the substrate surface such that longitudinal axes of the elongated nano objects are perpendicular to the substrate surface.

2. The method for assembling a macroscopic structure with elongated nano objects as recited in claim 1, wherein the hydrophobic tails of the elongated nano objects comprise a hydrocarbon chemical group.

3. The method for assembling a macroscopic structure with elongated nano objects as recited in claim 1, wherein the hydrophilic bodies of the elongated nano objects comprise a carboxylic acid chemical group.

4. The method for assembling a macroscopic structure with elongated nano objects as recited in claim 1, wherein the nano objects are carbon nanotubes made hydrophilic by oxidation in acid.

5. The method for assembling a macroscopic structure with elongated nano objects as recited in claim 4, comprising attaching a hydrophobic chemical group to an end of the carbon nanotubes made hydrophilic by oxidation in acid.

6. The method for assembling a macroscopic structure with elongated nano objects as recited in claim 1, wherein the substrate comprises glass coated with a layer of hydrophobic material.

7. The method for assembling a macroscopic structure with elongated nano objects as recited in claim 1, further comprising applying one or more of a pressure, an external electrical field, and a magnetic field to the suspension.

8. A method for assembling a macroscopic structure with elongated nano objects, the method comprising:
    (a) processing the elongated nano objects such that tails of the elongated nano objects are hydrophilic and bodies of the elongated nano objects are hydrophobic;
    (b) admixing the processed elongated nano objects in a suitable hydrophilic solvent to form a suspension, the suspension having a concentration, a temperature and a pH level;
    (c) submersing a hydrophilic substrate into the suspension;
    (d) changing either the concentration, temperature or the pH value of the suspension thereby assembling the elongated nano objects on a surface of the substrate, wherein the tails of the elongated nano objects attach to the substrate surface such that longitudinal axes of the elongated nano objects are perpendicular to the substrate surface.

9. The method for assembling a macroscopic structure with elongated nano objects as recited in claim 8, further comprising applying one or more of a pressure, an external electrical field, and a magnetic field to the suspension.

10. A method for assembling a macroscopic structure with elongated nano objects, the method comprising:
    (a) processing the elongated nano objects such that tails of the elongated nano objects are hydrophobic and bodies of the elongated nano objects are hydrophilic;
    (b) admixing the processed elongated nano objects in a suitable hydrophobic solvent to form a suspension, the suspension having a concentration, a temperature and a pH level;
    (c) submersing a hydrophobic substrate into the suspension;
    (d) changing either the concentration, temperature or the pH value of the suspension thereby assembling the elongated nano objects on a surface of the substrate, wherein the tails of the elongated nano objects attach to the substrate surface such that longitudinal axes of the elongated nano objects are perpendicular to the substrate surface; and
    (e) wherein the hydrophobic solvent comprises an aromatic hydrocarbon and wherein the aromatic hydrocarbon is toluene.

* * * * *

UNITED STATES PATENT AND TRADEMARK OFFICE
CERTIFICATE OF CORRECTION

| | |
|---|---|
| PATENT NO. | : 7,147,894 B2 |
| APPLICATION NO. | : 10/103803 |
| DATED | : December 12, 2006 |
| INVENTOR(S) | : Zhou et al. |

It is certified that error appears in the above-identified patent and that said Letters Patent is hereby corrected as shown below:

Item (75)

On title page, change:

Hideo Shimoda, Chapel Hill, NC (US) to

Hideo Shimoda, Chapel Hill, NC (JP).

Item (75)

On title page, change:

Soojin Oh, Chapel Hill, NC (US) to

Soojin Oh, Chapel Hill, NC (KR).

Signed and Sealed this

Third Day of April, 2007

JON W. DUDAS
*Director of the United States Patent and Trademark Office*